(12) United States Patent
Daoud

(10) Patent No.: US 7,750,056 B1
(45) Date of Patent: Jul. 6, 2010

(54) LOW-DENSITY, HIGH R-VALUE TRANSLUCENT NANOCRYSTALLITES

(76) Inventor: Sami Daoud, 245 Deerfield Ct., New Hope, PA (US) 18938

( * ) Notice: Subject to any disclaimer, the term of this patent is extended or adjusted under 35 U.S.C. 154(b) by 0 days.

(21) Appl. No.: 11/905,518

(22) Filed: Oct. 2, 2007

Related U.S. Application Data

(60) Provisional application No. 60/848,631, filed on Oct. 3, 2006.

(51) Int. Cl.
B01J 13/00 (2006.01)
B01J 21/00 (2006.01)

(52) U.S. Cl. ...................... 516/104; 423/335

(58) Field of Classification Search ......... 516/100–104, 516/111; 423/338; 427/419, 420; 428/404
See application file for complete search history.

(56) References Cited

U.S. PATENT DOCUMENTS

| | | |
|---|---|---|
| 4,169,926 A | 10/1979 | McDaniel |
| 4,359,537 A | 11/1982 | Chong |
| 4,443,257 A | 4/1984 | Tomaiuolo et al. |
| 4,849,378 A | 7/1989 | Hench et al. |
| 4,933,105 A | 6/1990 | Fong |
| 5,023,208 A | 6/1991 | Pope et al. |
| 5,035,876 A | 7/1991 | Castellano |
| 5,057,296 A | 10/1991 | Beck |
| 5,098,684 A | 3/1992 | Kresge et al. |
| 5,110,573 A | 5/1992 | Johnson |
| 5,112,676 A | 5/1992 | Cot et al. |
| 5,196,177 A | 3/1993 | Watanabe et al. |
| 5,264,197 A | 11/1993 | Wang et al. |
| 5,382,558 A | 1/1995 | Inagaki et al. |
| 5,565,142 A | 10/1996 | Deshpande et al. |
| 5,580,655 A | 12/1996 | El-Shall et al. |
| 5,599,759 A | 2/1997 | Inagaki et al. |
| 5,622,684 A | 4/1997 | Pinnavaia et al. |
| 5,647,962 A | 7/1997 | Jansen et al. |
| 5,686,031 A | 11/1997 | Coronado et al. |
| 5,698,140 A | 12/1997 | Lamb et al. |
| 5,698,483 A | 12/1997 | Ong et al. |
| 5,725,802 A | 3/1998 | Chittofrati et al. |
| 5,731,261 A | 3/1998 | Balducci et al. |
| 5,746,992 A | 5/1998 | Yoldas et al. |
| 5,770,172 A | 6/1998 | Lilnehan et al. |
| 5,795,557 A | 8/1998 | Pajonk et al. |
| 5,888,425 A | 3/1999 | Schwertfeger et al. |
| 5,911,658 A | 6/1999 | Yoldas |
| 5,922,299 A | 7/1999 | Bruinsma et al. |
| 5,942,553 A | 8/1999 | Biesmans et al. |
| 5,948,482 A * | 9/1999 | Brinker et al. ............... 516/33 |
| 6,140,377 A | 10/2000 | Schwertfeger et al. |
| 6,156,386 A | 12/2000 | Schwertfeger |
| 6,172,120 B1 | 1/2001 | Smith et al. |
| 6,210,751 B1 | 4/2001 | Schwertfeger |
| 6,248,686 B1 * | 6/2001 | Inagaki et al. ............... 502/158 |
| 6,264,741 B1 | 7/2001 | Brinker et al. |
| 6,300,385 B1 | 10/2001 | Hashida et al. |
| 6,315,971 B1 | 11/2001 | Wallace et al. |
| 6,344,240 B1 | 2/2002 | Menon et al. |
| 6,378,229 B1 | 4/2002 | Hartel et al. |
| 6,447,991 B1 | 9/2002 | Daitch et al. |
| 6,485,805 B1 | 11/2002 | Smith et al. |
| 6,598,283 B2 | 7/2003 | Rouanet et al. |
| 6,670,402 B1 | 12/2003 | Lee et al. |
| 6,740,416 B1 | 5/2004 | Yokogawa et al. |
| 6,764,667 B1 | 7/2004 | Steiner, III |
| 6,869,584 B2 | 3/2005 | Ying et al. |
| 2004/0267038 A1 * | 12/2004 | Tatsumi et al. ............... 556/413 |
| 2006/0099130 A1 | 5/2006 | Roque-Malherbe et al. |

FOREIGN PATENT DOCUMENTS

WO WO 2007/024925 A2 * 3/2007

OTHER PUBLICATIONS

Nicola Husing, "Aerogels", Jul. 2005, Wiley-VCH Verlag GmbH & Co. KGaA, Weinheim, pp. 12, 14, online @ www.wiley-vch.de/vch/software/ullmann/pdf/Aerogels.pdf.*

Mari-Ann Einarsrud, "Light gels by conventional drying", Journal of Non-Crystalline Solids 225 (1998) 1-7, Elsevier Science.*

Rolison et al., "Electrically conductive oxide aerogels: new materials in electrochemistry", Journal of Materials Chemistry, Royal Society of Chemistry Feb. 19, 2001.*

* cited by examiner

*Primary Examiner*—Ling-Siu Choi
*Assistant Examiner*—Chun-Cheng Wang

(57) ABSTRACT

The inventions provide nanocrystallites and processes for the production of these nanocrystallites according to known silica-based sol-gel preparation principles based on hydrolysis/condensation mechanisms. The processes include a synthesis step comprising providing a homogenized colloidal dispersion of precursors, catalyst, and surfactant to form the sol matrix. The processes further include a novel drying step for a wet hydrogel intermediate product, including a short-cycle drying period during which the liquids present in this hydrogel can be evaporated at ambient pressure and low temperature ranges in any convenient drying apparatus while, inter alia, preserving the gel structure, especially gel porosity. Porosity values for the dried product up to about 98-99% can be attained, with product He densities as low as about 0.033 g/cc.

Nanocrystallites produced by this process have, inter alia, excellent clarity, thermal insulation, acoustic insulation, surface scattering, and bulk modulus properties.

17 Claims, 5 Drawing Sheets

Exemplary Base Catalyzed Laboratory Process for Manufacture of CrystalGel Hydrogel Exemplary Acid/Base Catalyzed Laboratory Process for Manufacture of CrystalGel Hydrogel

LOW-DENSITY, HIGH R-VALUE TRANSLUCENT NANOCRYSTALLITES

CROSS-REFERENCE TO RELATED APPLICATION

This application claims priority from U.S. provisional patent application Ser. No. 60/848,631 filed on Oct. 3, 2006, and the disclosure of this priority document is incorporated herein by reference in its entirety.

BACKGROUND OF THE INVENTION

The invention relates to a method for the production of silica-based nanocrystallites characterized by a nanoporous (or "mesoporous") 3-dimensional silica-based network of high water and oxygen permeability, having a granular, monolithic, or hybrid geometric structure. The invention further relates to these nanocrystallites, which, inter alia, are highly translucent with excellent optical clarity, and exceptionally high porosity, low density, and high permeability characteristics and which have superior thermal insulating, vibration (dynamic), and acoustic (static) barrier properties.

Silica-based hydrogels such as aerogels, xerogels, nanogels, ambigels, and the hydrogels of the present invention are chemically inert, highly porous ceramic materials useful in many applications. They are commonly produced by sol-gel processes based on hydrolysis/polycondensation (H/P) reactions well-known in the art. Typically, a sol is prepared from a source of silica such as a silicate or alkoxide by dispersing the silica source in a synthesis solvent comprising water or a water/alkanol solution and one or more gelation catalysts. Products of silica hydrolysis then condense, forming a sol system comprising a network of linked silica particles. Often, a silating agent is introduced to cap free hydroxyl groups on the polycondensation products, thereby rendering them hydrophobic.

After the sol system reaches its gel point, the sol-gel is set aside to age, allowing hydrolysis and condensation of reactants to continue while the sol-gel self-assembles, strengthening the gel structure and increasing its density; this step also influences the optical, mechanical, acoustic, thermal and other properties of the gel. During the aging step, the gel is usually contacted with pure alcohol or other low surface tension topping agent to displace water of condensation present in the nanoporous structure of the gel. The product wet hydrogel is then dried.

Drying the wet hydrogel, which at this stage is weakly structured, is a critical step in this process. Owing to the high capillary stress exerted on the wet gel network during drying, this intermediate product is at high risk of compression, extended cracking, shrinkage, and pore collapse, particularly in highly porous, low density gel structures having relatively high surface areas, e.g., of at least about 600 $m^2/g$, such as aerogels in the range of about 700 $m^2/g$ and the hydrogels of this invention (also referred to herein as "CrystalGel hydrogel"), whose surface areas are in the range of about 1000 $m^2/g$. If care is not taken in the drying process, the wet gels are prone to structural weakness and significant brittleness (friability) when dried.

To avoid this outcome, many gel drying processes have been proposed in this art. Alkane drying solvents have been used for ambigels and xerogels, which have surface areas in the ranges of about 600 $m^2/g$ and 400 $m^2/g$, respectively. However, this is a costly and a tedious process which requires numerous washes, extensive pollution abatement steps, and expensive hazard prevention equipment, although gel porosity may often be well-preserved. Alternate methods for drying these gels include the use of high-purity acetone or a similar extraction solvent for water removal, followed by acetone replacement with a solvent of low surface tension such as high-purity hexane, heptane, or octane, which minimizes stresses caused by otherwise rapid evaporation of the extraction solvent. The low surface tension solvent is then removed, as by decanting, and any residual solvent is allowed to slowly evaporate or is removed under vacuum to preserve porosity. Aerogels, of higher porosity, higher surface area, and lower density than the ambigels and xerogels, are commonly now dried at supercritical temperatures and pressures in the range of about 95-104° F. and about 1200-1500 psi under $CO_2$ in autoclaves or comparable high pressure apparatus. Porosity retention values of the supercritically dried products can range up to about 95%; however, the drying equipment is expensive and the drying conditions are often very hazardous.

It is accordingly desirable to provide methods for the preparation of highly porous and highly permeable silica-based hydrogels which include a drying step that minimizes internal stresses on the wet gel structure during drying, obviating cracking, shrinkage, pore loss, and other detrimental effects on the product dried gel, and which does not require the use of toxic solvents or extreme process conditions. It is further desirable to provide a silica-based crystallite of high porosity, high-permeability, and low density with excellent translucency, clarity, thermal insulation, vibration and acoustic barrier, and bulk modulus properties as producible by this process.

SUMMARY OF THE DISCLOSURE

The inventions provide nanocrystallites and processes for the production of these nanocrystallites based on known silica-based sol-gel preparation principles according to the hydrolysis/condensation mechanisms described supra and in the known art. The processes include a novel synthesis step comprising the use of a substantially homogenous colloidal dispersion of silica source, catalyst, and surfactant to form the sol matrix. The processes further include a novel drying step for a wet hydrogel intermediate product, including a short-cycle drying period during which the liquids present in this hydrogel can be evaporated at ambient pressure and temperature ranges at or below about 212° F., in any convenient drying apparatus while, inter alia, preserving the gel structure, especially gel porosity. Porosity retention values for the dried product up to about 98-99% can be attained, with product He densities as low as about 0.03 g/cc.

Nanocrystallites produced by this process as further described infra have excellent clarity, density, R-values, thermal conductivity, sound velocity, refractive indexes and bulk modulus.

BRIEF DESCRIPTION OF THE DRAWINGS

FIG. 5 is a photograph of a larger geometric structure produced by a process of the invention.

DETAILED DESCRIPTION OF THE INVENTION

Figure 1:
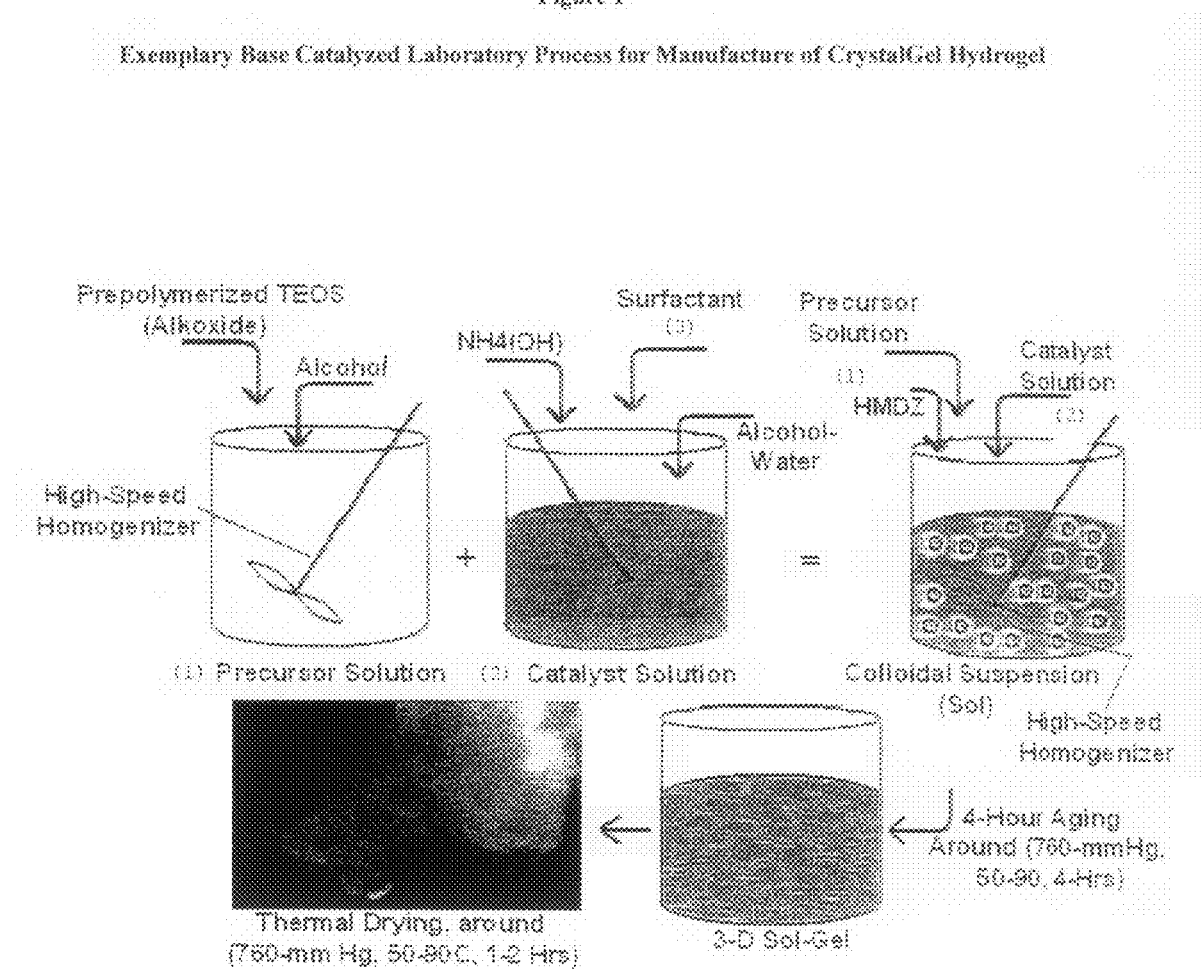
FIGS. 1 and 2 illustrate two exemplary laboratory processes for making the product nanocrystallites of the invention.

According to the invention, a sol is prepared from (1) a precursor solution comprising a silica source and water and/ or a lower alkanol synthesis solvent; other conventional synthesis solvents such as higher alcohols can be used or included in the precursor solution as appropriate; (2) at least one catalyst solution comprising a gelation catalyst for the silica source and a conventional solvent for the selected catalyst, preferably a water, water and alcohol, or alcohol-only solvent, and (3) a surfactant. In a currently preferred embodiment of the invention as exemplified herein, a basic catalyst is used for gelation of a prepolymerized silica alkoxide precursor solution in an amount sufficient to provide a sol having a pH of at least about 8.0, usually about 8.0-13.5, more preferably about 10.0-13.2, and most preferably about 12.0-13.5, especially about 13.0, to optimize thermal, optical, and mechanical properties, with an anionic surfactant, present in either one or both of the two solutions, preferably in the catalyst solution.

Conveniently, commercially prepolymerized silica alkoxides are used as the silica source in the precursor solution. These alkoxides are widely available (infra) and are typically produced by addition of a non-stoichiometric amount of water and acid catalyst to a solution of alcohol and a silica alkoxide such as an alkylorthosilicate. A minimal amount of alcohol is generally used in this step in order to keep the solution homogenous. After completion of the reaction (usually approximately 16 hours), the alcohol solvent as well as the alcohol produced during the reaction is removed from the system, as by distillation. The viscous product remaining after distillation is a partially hydrolyzed and partially condensed silicon oxide composition, which can be stored for later use. For use in the present inventions, this prepolymerized composition is first diluted with a non-alcoholic solvent, such as acetone, ether or acetonitrile, or as otherwise instructed, and used as a precursor solution (1). A catalyst solution as described above (2), surfactant (3) and this precursor solution are then admixed to form a sol which undergoes further hydrolysis and condensation, usually to the gel point, with added water if needed. The gelation time depends on the target density of the gel, but even in the case of the most diluted samples, it will generally not exceed 72 hours.

The precursor and catalyst solutions (1) and (2), supra, with surfactant (3) are slowly combined with sufficiently vigorous agitation to form a substantially uniformly homogenized sol comprising colloidal silica particles preferably ranging in size from about 2 nm to 200 nm (as larger particles tend to aggregate), finely dispersed in the aqueous medium. A high-speed homogenizer is recommended to obtain a high-shear, homogenized colloidal dispersion. Best results are usually obtained by first adding the surfactant to the catalyst solution and then adding the precursor solution to the catalyst/surfactant solution, as this produces an oil-in-water (O/W) suspension which is kinetically more stable than a water-in-oil suspension (W/O) and provides a final product having a lower density, higher optical clarity (glass-like), and a higher porosity than a W/O suspension.

The sol is then briefly rested, conveniently at ambient temperature, until it gels; this sol-gel is then preferably topped with catalyst solution (2) for maintaining a fluid environment for the gel and promoting reaction of unreacted species, or pure ethanol or other conventional topping agent(s), and set aside to age at ambient or higher temperature. If a hydrophobic crystallite is desired, a silating agent such as hexamethylenedisilazane (HMDZ) or other agent for capping free hydroxyl groups is introduced as known in the art, preferably at the sol-state immediately before its gel point is reached to ensure that hydrophobic characteristics are effectively imparted and to prevent the accumulation of excessive pore water, which extends the drying cycle. The sol should preferably have a pH of at least about 8.0 when the silating agent is added.

During aging, the gel (alcogel, if the primary liquid component of the gel is alcohol) self-assembles and strengthens, maturing into a nanoporous colloidal 3-dimensional interconnected and structured hydrogel comprising a network or matrix of linked silicon oxide particles in solution.

The wet hydrogel is then broken into pieces (e.g., granulated) if desired, and dried at an ambient pressure of about 14.5-14.9 psi, preferably an ambient pressure of about 14.7 psi, and at a temperature at or below about 212° F., preferably about 120-200° F. and, depending in part on the geometric structure, more preferably about 150-175° F., to evaporate substantially all water and other residual liquid present from the nanoporous hydrogel structure and obtain the dry nanocrystallite product of the invention. Higher temperatures in this range will usually be more suitable for geometric structures with less surface area than granules have.

The dried hydrogel obtained by the above-described process has properties in part attributable to the short-cycle drying time. The length of time required for drying the wet hydrogel varies according to, inter alia, pore size distribution, tortuosity of the primary pores, thickness and surface area of the gel, and the selected drying temperature. Drying times of less than about 12 hours, for example about 6-12 hours, are exemplary. Generally drying time is within the range of 2-24 hours, typically 4-16 hours for many applications. Drying can take place in any convenient apparatus such as a convection oven or fluid bed dryer. Ambient atmosphere is sufficient; however, any conventional drying gas can be substituted/added as desired.

The drying period can be followed by an annealing step as a good manufacturing practice (GMP), for example, to reduce dust during transportation and handling of dried granules. Annealing can be carried out at ambient pressure, for example, at about 150-350° F. for 2-4 hours, and for granules, preferably about 180-200° F. for about 1 hour, or until the granules acquire sufficiently high mechanical integrity to become substantially non-friable, with minimalized dustiness and fragility. Slabs or other large pieces are preferably annealed for about 1 hour at about 250-300° F., and most preferably for about 30 minutes at about 300° F. If, during aging, the sol-gel has not undergone sufficient residence time or conditions to achieve sufficient self-assembly and strengthening of the crystal lattice structure, annealing may be critical, particularly when handling large structures, for obtaining a superior product from this gel.

Figure 2:
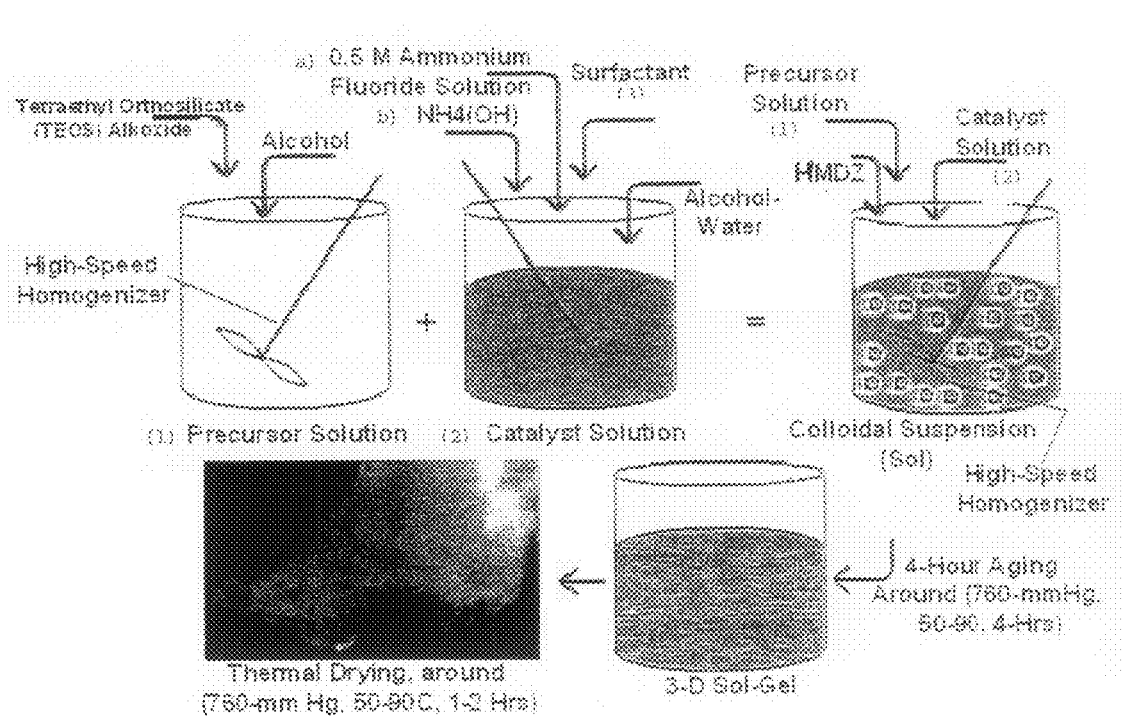

While the source of silica is exemplified herein as, for example, an alkoxy silane or a silica alkoxide (or mixtures thereof), which are relatively easy to work with, other sources of silica which are known to be useful in the described hydrolysis/condensation gel synthesis system are contemplated. Sources of silica potentially useful in the practice of the invention include sodium silicate, sodium metasilicate, alkyl silicates and isoalkyl silicates. Preferred silica sources include tetraethylorthosilicate (TEOS), precondensed tetraethylortho-silicate, tetramethoxysilane (TMOS), tetra-n-propoxysilane, and mixtures thereof. Commercial precondensed TEOS products such as Silbond H-5, H-25, H-30, H-40, and H-50, available from Silbond Corporation, Weston, Mich., USA are particularly convenient, as they provide a simple one-catalyst (base catalyzed) process according to the inventions (FIG. 1). Non-condensed silica sources can be used, e.g., in an acid/base catalyzed process according to the inventions, wherein the catalyst solution (2) includes an acid catalyst in addition to the basic catalyst (FIG. 2). Alternately, non-condensed silica sources can be precondensed in the practice of the invention according to conventional H/P processes as described herein or known in the art, for use as precursor in solution (1). Typically, this will require a first acid catalyst, such as ammonium fluoride, followed by a second basic catalyst such as ammonium hydroxide or otherwise described herein or in the art. The precondensed commercial products typically contain enough water to complete the hydrolysis/condensation reaction and no supplemental water should be required for this purpose in the reaction solutions of the invention. The addition of more water to the formula is a technical approach for e.g., reducing the final density of the nanocrystallite; for example, on a stoichiometric basis, about 6.5-7.5 moles of water per mole of silica alkoxide such as TEOS should generally yield the most desirable (low) end density properties for the hydrogel of the invention.

Any gelation catalyst recognized in the art for the hydrolysis/condensation reaction of the present invention can be used, provided it is compatible with the reagents in the amounts required to adjust the pH of the reaction solutions as needed for optimal results. In addition to the ammonium hydroxide exemplified herein, common useful basic catalysts include sodium hydroxide, tetramethylammonium hydroxide, tetramethylguanidine hydroxide, trimethylsulfonium hydroxide, trialkylselenium hydroxides, gamma-amino propyl triethoxysilane, N-2-(aminoethyl)-3-amino propyltrimethoxysilane (AEAPTMS), vinyltrimethoxysilane, vinyltris(2-methoxyethoxy) silane, 3-methacryloxypropyltrimethoxy silane, 2-(3,4-epoxycyclohexy)-ethyl trimethoxysilane, 3-glycidoxy-propyltriethoxysilane, 3-isocyanatopropyltriethoxysilane and 3-cyanatopropyltriethoxysilane.

The temperature at which the sol-gel is aged is conveniently ambient temperature; however, temperature ranges from about 40-150° F. are also suitable; preferably, the aging temperature is about 60-120° F., more preferably, about 75-100° F., or, most preferably, about 100-120° F. Typically, aging (the stage of molecular self-assembly) will be satisfactorily accomplished in about 24 hours or less, for example, about 2-24 hours, usually about 4-24 hours, or more usually about 5-12 hours or 6-8 hours, depending upon the intended application of the product and other factors. The aging time is partially dependent on the aging temperature, with lower temperatures requiring longer aging periods. Properly-aged gels are easily identified by those of skill in the art: inter alia, they possess strong surface structures with low dusting and minimal friability potential of granules. In the best practice of the present inventions, they also possess high, glass-like optical clarity consistent with the time-dependent self-arrangement of the lattice (matrix) structure.

The surfactants present in the sol-state reaction dispersion serve to reduce surface tension and promote the desired fine dispersion of the colloidal silica particles. Within the scope of the invention however, the surfactants also function to reduce the systemic capillary forces commonly induced during conventional drying methods. As discussed supra, the mature hydrogel in solution is structurally weak and susceptible to compression and pore collapse due to thermal and/or mechanical stresses exerted during the drying step if care is not taken to preserve the hydrogel structure. The surfactants are critical to the processes of the present invention, as they permit the effective use of ambient pressures and moderate temperatures for drying by, for example, reducing systemic capillary forces that would otherwise be exerted on the secondary nanoparticles, thereby preserving porosity in the dried product.

Surfactants useful in the system comprise anionics, non-ionics and cationics, or mixtures thereof, preferably from the same family. Cationics are generally the least preferred and are seldom the most useful at the present stage of the art. Non-ionics are more preferred than cationics, and the most preferred are anionic surfactants. Particularly useful anionic surfactants include sodium lauryl (dodecyl) sulfate and ammonium lauryl sulfate. Other useful anionic surfactants include sodium cholate, sodium deoxycholate (DOC), N-lauroylsarcosine sodium salt, lauryldimethylamine-oxide (LDAO), cetyltrimethylammoniumbromide (CTAB), bis(2-ethylhexyl) sulfosuccinate sodium salt, ammonium laureth sulfate, sodium laureth sulfate, TEA lauryl sulfate and TEA laureth sulfate. Additional useful anionic surfactants are the Henkel products StandapolT® (TEA lauryl sulfate); Standapol EA 3® (ammonium laureth sulfate), Standapol WA-LC® (sodium laureth sulfate), and Plantaren 2000® (decyl glucoside), Henkel Corporation, Rocky Hill, Conn., USA; Zonyl® surfactants (DuPont Performance Chemicals, Wilmington, Del. 19898, USA) such as Zonyl FSA or FSP; and fluorosurfactants such as MASURF FS-710, FS-2620, FS-120A, FS-115, FS-130, FS-230, FS-330, FS-1030, FS-1400, FS-1620, FS-1825, FS-1900, and FS-2240, all registered trademarks of Mason Chemical Company, Arlington Heights, Ill., USA. Cationic surfactants include lauryl trimethyl ammonium chloride, stearyl trimethyl ammonium chloride, alkylbenzyl dimethyl ammonium chloride, and alkylbenzyl dimethyl ammonium chloride. Useful nonionic surfactants include ethoxylated and propoxylated nonionics, Zonyl FAO, Zonyl FSO-100, Zonyl FSN, Zonyl FSN-100, and Zonyl FS-300. As noted above, the surfactant(s) can be incorporated into either the precursor or catalyst solution; also they may be incorporated into both solutions. Total dry surfactant content of the selected solution or solutions will typically range between about 0.05% w/w to 5% w/w, based on the weight of a precursor silica alkoxide.

The nanocrystallites of the invention typically have a density in the range of about 0.03 g/cc to 0.25 g/cc. Typical crystallites have He densities (helium pycnometer) of about 0.03 g/cc to 0.20 g/cc, preferably about 0.04 g/cc to 0.09 g/cc, and most preferably about 0.05 g/cc to 0.07 g/cc. Porosity values are calculated from these density ranges by standard methods. Porosity values are herein calculated from densities according to the equation, porosity=1-density, as known in the art. The crystallites further typically have a clarity (C) in the range of about 0.0020-0.010 $\mu m^4/cm$, more preferably about 0.07 to 0.0073, for many applications. Clarity values reported herein were measured by spectroradiometry, as known in the art. These crystallites further typically have a surface scattering coefficient (A) range from about 0.30 to 0.95, more preferably from about 0.6 to 0.95; an R value (thermal insulation) range from about 15-45, more preferably from about 24 to 33; and a GPa (bulk modulus) range from about 0.150-0.500, more preferably from about 0.150 to 0.350. Surface scattering coefficient A, bulk modulus GPa, and insulation R values were measured by Spectroradiometry (coefficient A), Instron Universal Testing Machine (GPa), and ASTM C177 (R value); all these methods are conventional in this art.

Table I reports ranges of nanocrystallite values for samples according to the invention manufactured in the laboratory in small scale and in large samples.

TABLE I

CRYSTALGEL HYDROGEL PROPERTIES

| Property | Range (20-50 gm Samples) | Measured (250-500 gm Samples) |
|---|---|---|
| Clarity (C), $\mu m^4/cm$ | 0.0020-0.010 | 0.0033 |
| Surface Scattering Coefficient (A) | 0.30-0.95 | 0.8351 |
| Light Transmittance T, % | | |
| By itself (Artificial Light) | 20-35 | 33 |
| By itself (Blue-Sky Day) | 15-30 | 27 |
| Thermal Insulation (R) | 15-45 | 24-33 |
| Acoustic Insulation, Velocity of Sound, m/s | 75-750 | 90-125 91.3 |
| Moisture Uptake, % | | |
| Hydrophilic | 120-350 | 247% |
| Hydrophobic | 0.01-0.10 | 0.03 |
| Bulk Modulus, GPa | 0.150-0.500 | 0.223 |
| He Density, g/cc | 0.03-0.25 | 0.02-0.250 |
| Porosity | 92.50-98.82 | 98%-75% (calculated) |
| Internal Surface Area, m2/g | 600-1200 | 1073 |
| Dielectric Constant | 1.03-1.25 | 1.11 |
| Refractive Index | 1.00-1.10 | 1.02 |
| Coefficient of Thermal Expansion | $2.0-4.0 \times 10^{-6}$ | $2.25 \times 10^{-6}$ |
| Mean Pore Diameter, nm | 10.0-25.0 | 13.0 |
| Primary Particle Diameter, nm | 2.0-5.0 | 2.7 |
| Granular Particle Size, mm | 1.0-10.0 | 2.50 |

The following Examples 1-4 illustrate the practice of the inventions.

MATERIALS

Figure 3:
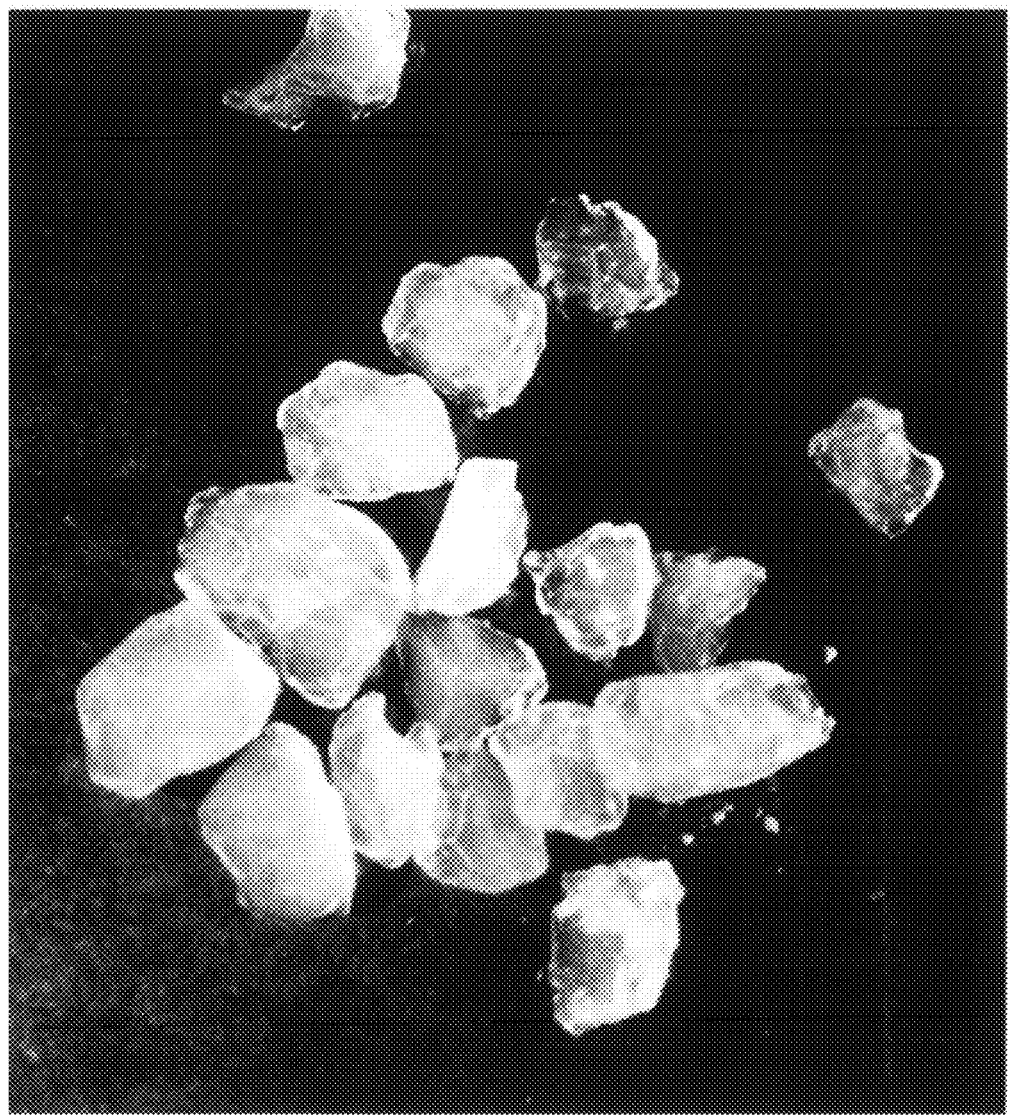
FIGS. 3-4 are photographs of granulated products of the invention as produced in the Examples.
Figure 4:
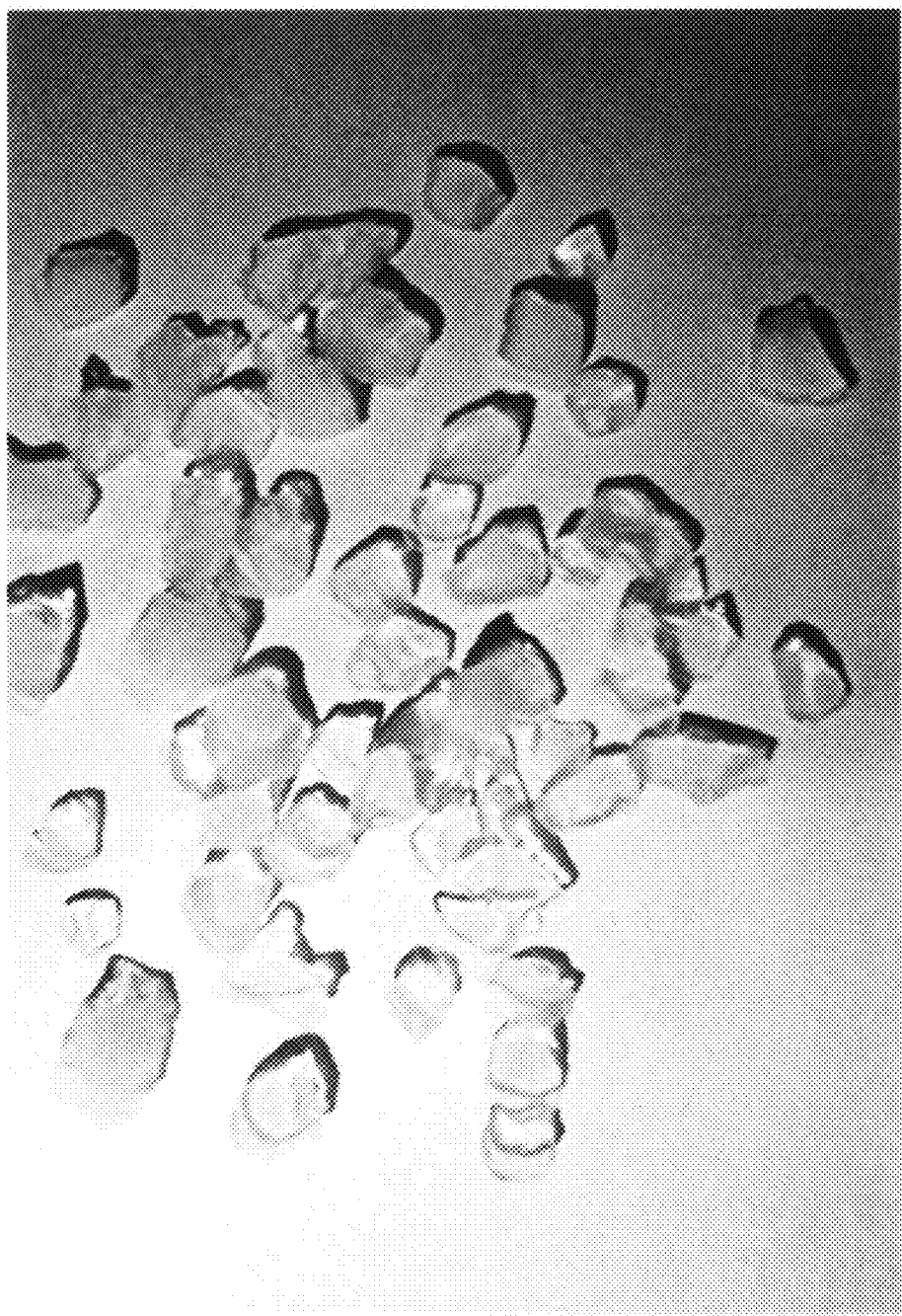
Figure 6:
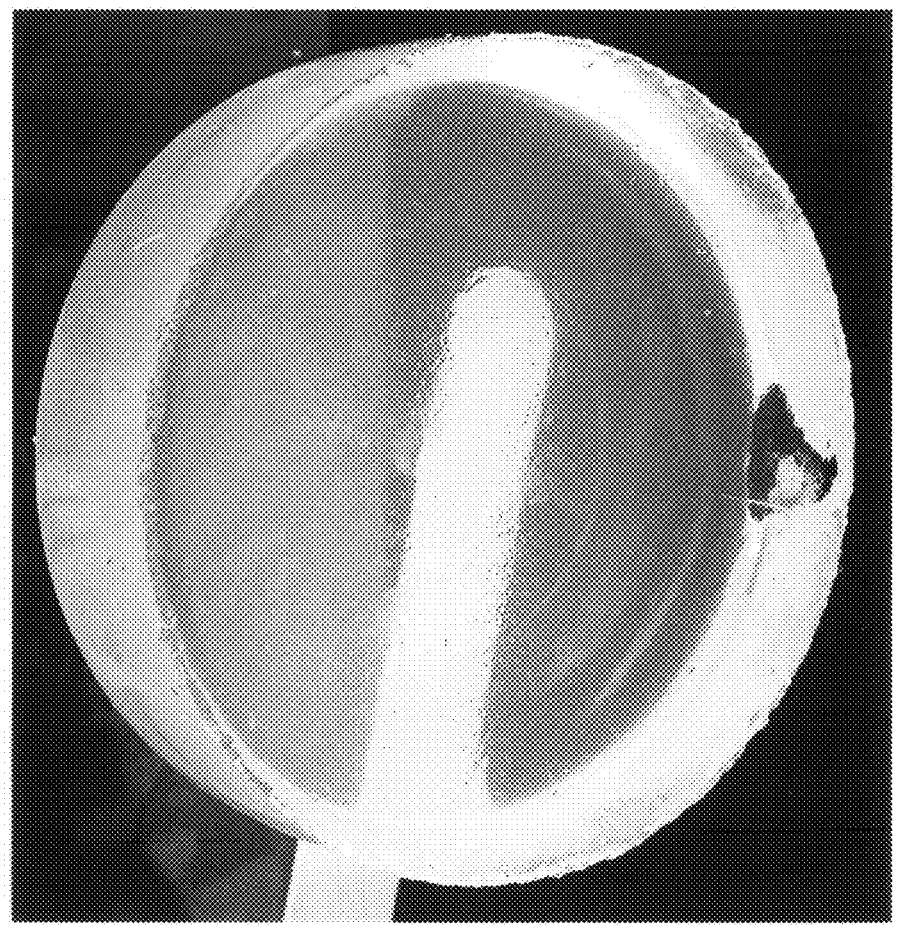

H-5: Silbond H-5®, a prepolymerized ethyl polysilicate from Silbond Corp., Weston, Mich., USA
Zonyl FSA®: Anionic surfactant from DuPont Performance Chemicals, Wilmington, Del., USA
HMDZ: Hexamethyldisilazane from Shin-Etsu MicroSi, Inc., Tempe, Ariz., USA FIGS. 3-4 are photos of products produced by the following processes.

EXAMPLE 1

Hydrophobic Hydrogel

A. Preparation of the Precursor Solution

Weight of H-5=104 grams

Weight of 200-proof ethyl alcohol=106.0 grams

Agitate H-5 solution in alcohol; mark as solution (1) and set aside.

B. Preparation of the Colloidal Catalyst Solution

Weight of 200-proof ethyl alcohol (solvent)=240 grams

Weight of 29% ammonium hydroxide (catalyst)=4.5 grams

Weight of ammonium lauryl sulfate (surfactant)=1.0 gram

Weight of hexamethyldisilazane (silating agent, HMDZ)=7.28 grams

While vigorously agitating to homogenize, add ammonium lauryl sulfate to ethyl alcohol. Continue agitation and add 2.0 grams of 29% aqueous ammonium hydroxide solution to the surfactant-containing ethyl alcohol. Stop mixing. Mark as solution (2), and set aside.

C. Preparation of the Auxiliary Catalyst Solution

Weight of 200-proof ethyl alcohol=50 grams

Weight of 29% ammonium hydroxide=2.25 grams

While mixing the alcohol solution, add 2.25 grams of 29% aqueous ammonium hydroxide solution, and continue mixing for about 60 seconds. Mark as solution (3) and set aside.

D. Preparation of the Sol-gel

Vigorously agitate solution (2), and start adding solution (1). Continue agitation and add the remaining ammonium hydroxide (2.5 grams) to the solution. Continue agitation for 15-30 seconds. As viscosity starts rising quickly, add HMDZ moments before gel point. Stop mixing, and mark as mix (4). Let mix stand until it gels. Top the gel mass with solution (3) and set aside to age and self-assemble for 4-8 hours.

E. Drying the Gel

Decant the solution in mix (4), break the aged gel into small chunks. Place the chunks in a wide-mouth glass tray and place in the oven at 120° F. for 4-8 hours or until fully dry. Mark the dry granules as Batch # 1. Place granules in an oven and anneal at 180-200° F. for 1 hour. Place the annealed granules in a spherical barrel and tumble the granules for 25-30 minutes. Place the tumbled granules on a classifier and screen into desired particle sizes.

F. Properties of the Nanocrystallite Product pH (Sol)=10.7; pH catalyst solution=12.1; Final pH (at gel point)=11.9

Clarity (C)=0.00391 $\mu m^4/cm$

Surface Scattering Coefficient (A)=0.8113

Density (RHO)=0.071 g/cc

Average Particle Size=1.45 mm

R-Value (Calculated)=31

Thermal Conductivity=0.0027 W/M-° K.

Velocity of Sound (measured)=97.3 m/s

Refractive Index $\eta$=1.009

EXAMPLE 2

Hydrophobic Hydrogel

A. Preparation of the Colloidal Precursor Solution

Weight of H-5=104 grams

Weight of 200-proof ethyl alcohol=106.0 grams

Weight of ammonium lauryl sulfate=1.0 gram

Agitate ammonium lauryl sulfate in 200-proof ethyl alcohol. Continue agitation, while adding/dispersing H-5 in the above surfactant-containing 200-proof ethyl alcohol solution. Stop mixing/agitation. Mark as solution (1) and set aside.

B. Preparation of the Main Catalyst Solution

Weight of 200-proof ethyl alcohol=240 grams

Weight of 29% ammonium hydroxide solution=4.5 grams

Weight of hexamethyl disilazane (HMDZ)=7.28 grams

While agitating, add 2.0 grams of 29% ammonium hydroxide to the surfactant-containing ethyl alcohol. Stop mixing. Mark as solution (2), and set aside.

C. Preparation of the Auxiliary Catalyst Solution

Weight of 200-proof ethyl alcohol=50 grams

Weight of 29% aqueous ammonium hydroxide solution=2.25 grams

While mixing the alcohol solution, add 2.25 grams of 29% ammonium hydroxide, and continue mixing for about 60 seconds. Mark as solution (3) and set aside.

D. Preparation of the Sol-Gel

Vigorously agitate solution (1), and start adding solution (2). Continue agitation and add the remaining ammonium hydroxide (2.5 grams) to solution (1). Continue agitation for 5-10 seconds. As viscosity starts rising quickly, add HMDZ moments before gel point. Stop mixing, and mark as mix (4). Let mix stand until it gels. Top the gel mass with solution (3) and set aside to age and self-assemble for 4-8 hours.

E. Drying the Gel

Decant the solution in mix (4), break the aged gel into small chunks. Place the chunk granules (granules) in a wide-mouth glass tray and place in the oven at 120° F. for 4-8 hours or until fully dry. Mark the dry granules as Batch # 2. Place granules in a convection oven and anneal at 180-200° F. for 1 hour. Place the annealed granules in a spherical barrel and tumble the granules for 25-30 minutes. Place the tumbled granules on a classifier and screen into desired particle sizes.

F. Properties of Nanocrystallite Product pH (Sol)=11.3; pH Catalyst=12.1; Final pH (at gel point)= 11.9

Clarity (C)=0.00569 $\mu m^4/cm$

Surface Scattering Coefficient (A)=0.7310

Density (RHO)=0.091 g/cc

Average Particle Size=1.90 mm

R-Value (Calculated)=26

Thermal Conductivity=0.0030 W/M-° K.

Velocity of Sound (measured)=99.9 m/s

Refractive Index $\eta$=1.01

EXAMPLE 3

Hydrophobic Hydrogel

A. Preparation of the Precursor Solution

Weight of H-5=104 grams

Weight of 200-proof ethyl alcohol=106.0 grams

Slowly add H-5 to ethyl alcohol while agitating. Mark as solution (1); set aside.

B. Preparation of the Colloidal Catalyst Solution

Weight of 200-proof ethyl alcohol=240 grams

Weight of 29% ammonium hydroxide solution=4.5 grams

Weight of Zonyl-FSA surfactant=2.0 gram

Weight of hexamethyldisilazane (HMDZ)=7.28 grams

While agitating, add Zonyl-FSA to ethyl alcohol. Continue agitation and add 2.0 grams of 29% ammonium hydroxide to the surfactant-containing ethyl alcohol. Stop mixing. Mark as solution (2), and set aside.

C. Preparation of the Auxiliary Catalyst Solution

Weight of 200-proof ethyl alcohol=50 grams

Weight of 29% aqueous ammonium hydroxide=2.25 grams

While mixing the alcohol solution, add 2.25 grams of 29% ammonium hydroxide, and continue mixing for about 60 seconds. Mark as solution (3) and set aside.

D. Preparation of the Sol-Gel

Vigorously agitate solution (2), and start adding solution (1). Continue agitation and add the remaining ammonium hydroxide (2.5 grams) to the solution. Continue agitation for 15-30 seconds. As viscosity starts rising quickly, add HMDZ moments before gel point. Stop mixing, and mark as mix (4). Let mix stand until it gels. Top the gel mass with solution (3) and set aside to age and self-assemble for 4-8 hours.

E. Drying the Gel

Decant the solution in mix (4), break the aged gel into small chunks. Place the chunks in a wide-mouth glass tray and place in the oven at 120° F. for 4-8 hours or until fully dry. Mark the dry granules as Batch # 3. Place granules in an oven and anneal at 180-200° F. for 1 hour. Place the annealed granules in a spherical barrel and tumble the granules for 25-30 minutes. Place the tumbled granules on a classifier and screen into desired particle sizes.

F. Properties of Product Nanocrystallites pH (Sol)=10.7; pH Catalyst=11.5; Final pH (at Gel Point)= 11.8

Clarity (C)=0.004212 $\mu m^4/cm$

Surface Scattering Coefficient (A)=0.7963

Density (RHO)=0.079 g/cc

Average Particle Size=1.75 mm

R-Value (Calculated)=28.4

Thermal Conductivity=0.0029 W/M-° K.

Velocity of Sound (measured)=98.6 m/s

Refractive Index $\eta$=1.009

EXAMPLE 4

Hydrophobic Hydrogel

A. Preparation of Colloidal Precursor Solution

Weight of H-5=104 grams

Weight of 200-proof ethyl alcohol=106.0 grams

Weight of Zonyl-FSA surfactant=2.0 gram

Agitate Zonyl-FSA in 200-proof ethyl alcohol.

Continue agitation, while adding/dispersing H-5 in the above surfactant-containing 200-proof ethyl alcohol solution. Stop mixing/agitation. Mark as solution (1) and set aside.

B. Preparation of the Main Catalyst Solution

Weight of 200-proof ethyl alcohol=240 grams

Weight of 29% aqueous ammonium hydroxide solution=4.5 grams

Weight of hexamethyldisilazane (HMDZ)=7.28 grams

While agitating, add 2.0 grams of 29% ammonium hydroxide to the surfactant-containing ethyl alcohol. Stop mixing. Mark as solution (2), and set aside.

C. Preparation of the Auxiliary Catalyst Solution

Weight of 200-proof ethyl alcohol=50 grams

Weight of 29% aqueous ammonium hydroxide solution=2.25 grams

While mixing the alcohol solution, add 2.25 grams of 29% ammonium hydroxide, and continue mixing for about 60 seconds. Mark as solution (3) and set aside.

D. Preparation of the Sol-Gel

Vigorously agitate solution (1), and start adding solution (2). Continue agitation and add the remaining ammonium hydroxide (2.5 grams) to solution (1). Continue agitation for 5-10 seconds. As viscosity starts rising quickly, add HMDZ moments before gel point. Stop mixing, and mark as mix (4). Let mix stand until it gels. Top the gel mass with solution (3) and set aside to age and self-assemble for 4-8 hours.

E. Drying the Gel

Decant the solution in mix (4), break the aged gel into small chunks. Place the chunks in a wide-mouth glass tray and place in the oven at 120° F. for 4-8 hours or until fully dry. Mark the dry granules as Batch # 4. Place granules in an oven and anneal at 180-200° F. for 1 hour. Place the annealed granules in a spherical barrel and tumble the granules for 25-30 minutes. Place the tumbled granules on a classifier and screen into desired particle sizes.

F. Properties of Product Nanocrystallite pH (Sol)=10.9; pH Catalyst=12.2; Final pH (at gel point)=11.1

Clarity (C)=0.00611 $\mu m^{4}/cm$

Surface Scattering Coefficient (A)=0.7770

Density (RHO)=0.096 g/cc

Average Particle Size=1.75 mm

R-Value (Calculated)=28

Thermal Conductivity=0.0029 W/M-° K.

Velocity of Sound (measured)=99.4 m/s

Refractive Index $\eta$=1.009

EXAMPLE 5

Hydrophobic Hydrogel

A. Preparation of Colloidal Precursor Solution

Weight of 200-proof ethyl alcohol=50.0 grams

Weight of H-5=100 grams

Agitate H-5 in 200-proof ethyl alcohol. Mark as solution (1) and set aside.

B. Preparation of the Main Catalyst Solution

Weight of 200-proof ethyl alcohol=50 grams

Weight of de-ionized Water=25 grams

Weight of ammonium lauryl sulfate surfactant=1.75 grams

Weight of 29% aqueous ammonium hydroxide solution=15 grams

Weight of hexamethyldisilazane (HMDZ)=7.28 grams

While agitating (high-speed homogenization), add 1.75 grams of ammonium lauryl sulfate to water. Continue agitation for 30-seconds and add alcohol to the water-surfactant mix. Now add 15.0 grams of 29% ammonium hydroxide to the surfactant-containing ethyl alcohol. Stop mixing. Mark as solution (2), and set aside.

C. Preparation of the Auxiliary Catalyst Solution

Weight of 200-proof ethyl alcohol=50 grams

Weight of 29% aqueous ammonium hydroxide solution=10.25 grams

While mixing the alcohol solution, add 10.25 grams of 29% ammonium hydroxide, and continue mixing for about 60 seconds. Mark as Solution (3) and set aside.

D. Preparation of the Sol-Gel

Vigorously agitate solution (2), and start adding solution (1). Continue agitation for 5-10 additional seconds. As viscosity starts rising quickly, add HMDZ moments before gel point. Stop mixing, and mark as mix (4). Let mix stand until it gels. Top the gel mass with solution (3) and set aside to age and self-assemble for 4-8 hours.

E. Drying the Gel

Decant the solution in mix (4), break the aged gel into small chunks. Place the chunks in a wide-mouth glass tray and place in the oven at 120° F. for 4-8 hours or until fully dry. Mark the dry granules as Batch # 5. Place granules in an oven and anneal at 180-200° F. for 1 hour. Place the annealed granules in a spherical barrel and tumble the granules for 25-30 minutes. Place the tumbled granules on a classifier and screen into desired particle sizes.

F. Properties of Product Nanocrystallite pH (Sol)=12.7; pH Catalyst=13.1; Final pH (at gel point)=12.4

Clarity (C)=0.0065 $\mu m^{4}/cm$

Surface Scattering Coefficient (A)=0.754

Density (RHO)=0.091 g/cc

Average Particle Size=2.55 mm

R-Value (Calculated)=29

Thermal Conductivity=0.0021 W/M-° K.

Velocity of Sound (measured)=94.4 m/s

Refractive Index $\eta$=1.012

EXAMPLE 6

Hydrophobic Hydrogel

A. Preparation of Colloidal Precursor Solution

Weight of 200-proof ethyl alcohol=75.0 grams

Weight of H-5=100 grams

Agitate H-5 in 200-proof ethyl alcohol. Mark as solution (1) and set aside.

B. Preparation of the Main Catalyst Solution

Weight of 200-proof ethyl alcohol=50 grams

Weight of de-ionized water=50 grams

Weight of ammonium lauryl sulfate surfactant=1.75 grams

Weight of 29% aqueous ammonium hydroxide solution=13 grams

Weight of hexamethyldisilazane (HMDZ)=7.28 grams

While agitating (high-speed homogenization), add 1.75 grams of ammonium lauryl sulfate to water. Continue agitation for 30-seconds and add alcohol to the water-surfactant mix. Now add 13.0 grams of 29% ammonium hydroxide to the surfactant-containing ethyl alcohol. Stop mixing. Mark as solution (2), and set aside.

C. Preparation of the Auxiliary Catalyst Solution

Weight of 200-proof ethyl alcohol=75 grams

Weight of 29% aqueous ammonium hydroxide solution=10.25 grams

While mixing the alcohol solution, add 12.0 grams of 29% ammonium hydroxide, and continue mixing for about 60 seconds. Mark as solution (3) and set aside.

D. Preparation of the Sol-gel

Vigorously agitate solution (2), and start adding solution (1). Continue agitation for 5-10 additional seconds. As viscosity starts rising quickly, add HMDZ moments before gel point. Stop mixing, and mark as mix (4). Let mix stand until it gels. Top the gel mass with solution (3) and set aside to age and self-assemble for 4-8 hours.

E. Drying the Gel

Decant the solution in mix (4), break the aged gel into small chunks. Place the chunks in a wide-mouth glass tray and place in the oven at 120° F. for 4-8 hours or until fully dry. Mark the dry granules as Batch # 6. Place granules in an oven and anneal at 180-200° F. for 1 hour. Place the annealed granules in a spherical barrel and tumble the granules for 25-30 minutes. Place the tumbled granules on a classifier and screen into desired particle sizes.

F. Properties of Product Nanocrystallite pH (Sol)=12.9; pH Catalyst=13.4; Final pH (at gel point)=12.3

Clarity (C)=0.0060 $\mu m^{4}/cm$

Surface Scattering Coefficient (A)=0.735

Density (RHO)=0.097 g/cc

Average Particle Size=2.0 mm

R-Value (Calculated)=27

Thermal Conductivity=0.0019 W/M-° K.

Velocity of Sound (measured)=94.1 m/s

Refractive Index $\eta$=1.011

EXAMPLE 7

Hydrophilic Hydrogel

A. Preparation of Colloidal Precursor Solution

Weight of 200-proof ethyl alcohol=75.0 grams

Weight of pre-condensed H-5=100 grams

Agitate H-5 in 200-proof ethyl alcohol. Mark as solution (1) and set aside.

B. Preparation of the Main Catalyst Solution

Weight of 200-proof ethyl alcohol=50 grams

Weight of de-ionized water=50 grams

Weight of ammonium lauryl sulfate surfactant=1.75 grams

Weight of 29% aqueous ammonium hydroxide solution=13 grams

While agitating (high-speed homogenization), add 1.75 grams of ammonium lauryl sulfate to water. Continue agitation for 30 seconds and add alcohol to the water-surfactant mix. Now add 13.0 grams of 29% ammonium hydroxide to the surfactant-containing ethyl alcohol. Stop mixing. Mark as solution (2), and set aside.

C. Preparation of the Auxiliary Catalyst Solution

Weight of 200-Proof ethyl alcohol=75 grams

Weight of 29% aqueous ammonium hydroxide solution=10.25 grams

While mixing the alcohol solution, add 12.0 grams of 29% ammonium hydroxide, and continue mixing for about 60 seconds. Mark as solution (3) and set aside.

D. Preparation of the sol-gel

Vigorously agitate solution (2), and start adding solution (1). Continue agitation for 5-10 additional seconds. As viscosity starts rising stop mixing and allow mix stand until it gels. Top the gel mass with solution (3) and set aside to age and self-assemble for 4-8 hours. Mark as mix (4).

E. Drying the Gel

Decant the solution in mix (4), break the aged gel into small chunks. Place the chunks in a wide-mouth glass tray and place in the oven at 120° F. for 4-8 hours or until fully dry. Mark the dry granules as Batch # 7. Place granules in an oven and anneal at 180-200° F. for 1 hour. Place the annealed granules in a spherical barrel and tumble the granules for 25-30 minutes. Place the tumbled granules on a classifier and screen into desired particle sizes.

F. Properties of Product Nanocrystallite pH (Sol)=12.6; pH Catalyst=13.1; Final pH (at gel point)=12.7

Clarity (C)=0.0060 $\mu m^{4}/cm$

Surface Scattering Coefficient (A)=0.710

Density (RHO)=0.103 g/cc

Average Particle Size=2.5 mm

R-Value (Calculated)=24

Thermal Conductivity=0.0031 W/M-° K.

Velocity of Sound (measured)=104.1 m/s

Refractive Index $\eta$=1.041

EXAMPLE 8

Porosity and Density Calculation 10.000-gram product sample was immersed in water and subjected to a 30 min deaeration under vacuum. Subsequently, the sample was left submerged in water at room temperature for 24 h, after which the immersed weight ($W_i$), the saturated weight ($W_s$) and the dry weight ($W_d$) were evaluated and used to determine the apparent density $\rho_a$, and the apparent porosity $\xi_a$, as follows:

$W_i$=10.51 grams $W_s$=13.076 grams $W_d$=10.015 grams $\xi_a$=100 $[(W_s-W_i)/(W_s-W_d)]$=100 $[(13.076-10.051)/(13.076-10.015)]$=100 (3.025/3.061)=100×0.9882=98.82%

$\rho_a$=$[(W_i-W_d)/(W_d)]\rho_L$ where $\rho_L$ (water density)=1.00 g/cc.

$\rho_a = [(10.051-10.015)/(10.015)] \cdot 1.00 = 0.036$ g/cc $\rho_L = (0.036/10.015) \times$

What is claimed is:

1. A method for synthesis, manufacture, and production of a silica nanocrystallite material comprising a colloidal dispersion, produced by using high speed homogenization, wherein a base catalyst is added to a solvent to form a catalyst solution and homogenized, using high speed homogenization, wherein a surface-active agent (surfactant) is dispersed in the catalyst solution using high speed homogenization thus forming a low surface tension catalyst solution; wherein a precursor solution is mixed with the catalyst solution while at the same time high speed homogenization is carried out, thus forming oil-in-water (O/W) emulsion, wherein a hydrolysis-polycondensation reaction mechanism takes place instantaneously with the aid of the catalyst, thus forming a hydrogel; wherein a hydrophobing agent is added few seconds prior to formation of the hydrogel, while homogenizing is in progress, thus rendering the hydrogel a sol-gel with hydrophobic characteristics.

2. The method of claim 1, wherein the hydrophobic sol-gel is allowed to stand for a period of 15-120 minutes to fully gel.

3. The method of claim 2, wherein upon full gelling, the sol is allowed to set for a period of 2-24 hours to undergo molecular self-assembly, thus fortification and re-enforcement of the nanoporous structure.

4. The method of claim 3, wherein self-assembly is carried out at standard atmospheric temperature and pressure.

5. The method of claim 1, wherein the precursor solution is the oil (O) phase suspended in an aqueous (W) phase, thus forming oil-in-water suspension (O/W).

6. The method of claim 1, wherein the precursor solution is the aqueous phase (W) in which the catalyst solution, which is the oil phase (O), is slowly added while homogenizing at high-speed.

7. The method of claim 1, wherein the surfactant is added to the catalyst solution in a quantity based on the weight of the precursor.

8. The method of claim 7, wherein the amount of surfactant is in the range of 0.05-5.00 percent, based on the weight of the precursor.

9. The method of claim 1, wherein the precursor solution comprises alkyl orthosilicate.

10. The method of claim 1, wherein the hydrophobing agent is hexamethyl disilazane (HMDZ).

11. The method of claim 1, wherein the process of addition of the hydrophobing agent is carried out at a pH level of 10-13.

12. The method of claim 1, wherein the process of addition of the hydrophobing agent is carried out to cap hydroxyl ions, thus rendering the hydrogel hydrophobic.

13. The method of claim 1, wherein the sol-gel is dried at/or below 212° F. (100° C.).

14. The method of claim 1, wherein the sol-gel is granulated to enhance rapid drying.

15. The method of claim 1, wherein the catalyst is ammonium hydroxide.

16. The method of claim 1, wherein the surface-active agent (SURFACTANT) is anionic, ammonium-based surfactant.

17. The method of claim 16, wherein the surface-active agent (SURFACTANT) is ammonium lauryl sulfate.

* * * * *